United States Patent [19]
Lesch et al.

[11] 3,958,611
[45] May 25, 1976

[54] APPARATUS FOR WINDING WIRE COILS FOR ELECTRICAL MACHINES

[75] Inventors: Karl Lesch; Gerhard Brademann, both of Oldenburg, Germany

[73] Assignee: Licentia Patent-Verwaltungs-G.m.b.H., Frankfurt am Main, Germany

[22] Filed: July 15, 1975

[21] Appl. No.: 596,202

[30] Foreign Application Priority Data
July 18, 1974 Germany............................ 2434480
July 18, 1974 Germany............................. 244363

[52] U.S. Cl............................. 140/92.1; 242/7.11
[51] Int. Cl.² ........................................ B21F 3/00
[58] Field of Search...................... 140/92.1, 92.2; 242/7.09, 7.11

[56] References Cited
UNITED STATES PATENTS
3,579,791   5/1971   Arnold.............................. 140/92.1
3,625,261   12/1971   Hill et al............................ 140/92.1

*Primary Examiner*—Lowell A. Larson
*Attorney, Agent, or Firm*—Spencer & Kaye

[57] ABSTRACT

An improved apparatus for producing coils for electrical machines of the type wherein the wire windings are formed on a coil winding body in the form of a slide core by means of flyers which are rotated relative to the coil winding bodies, so that the major portion of the wire windings are pushed, during the winding process, onto a coil holder which is in engagement with the slide core. The apparatus is provided with a plurality of adjacent slide cores, which are jointly in engagement with the same coil holder during the winding process and which are each provided with a respective flyer. The rotational movements of the individual flyers about the associated slide cores are controlled to be in synchronism with one another during the winding process, whereby a plurality of coils of the complete winding may be simultaneously wound.

27 Claims, 12 Drawing Figures

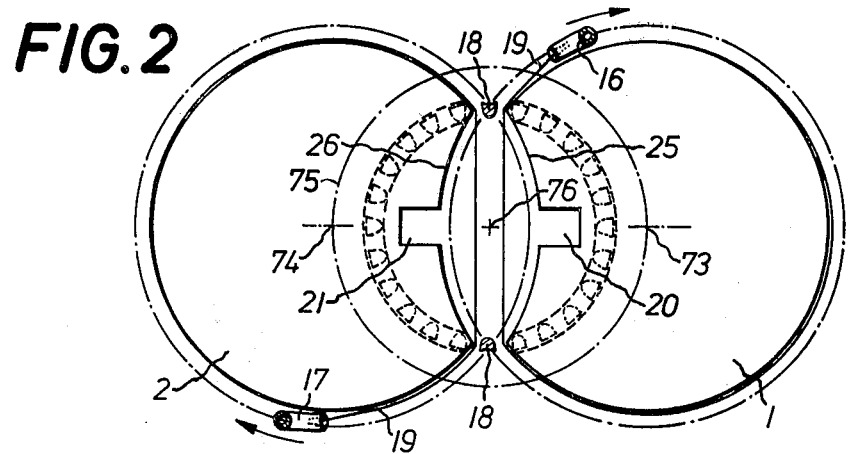
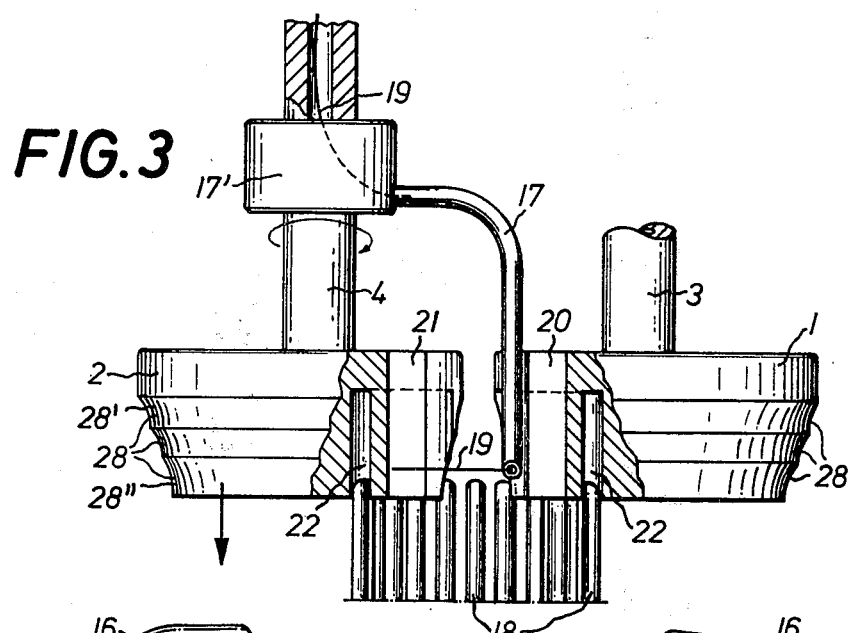
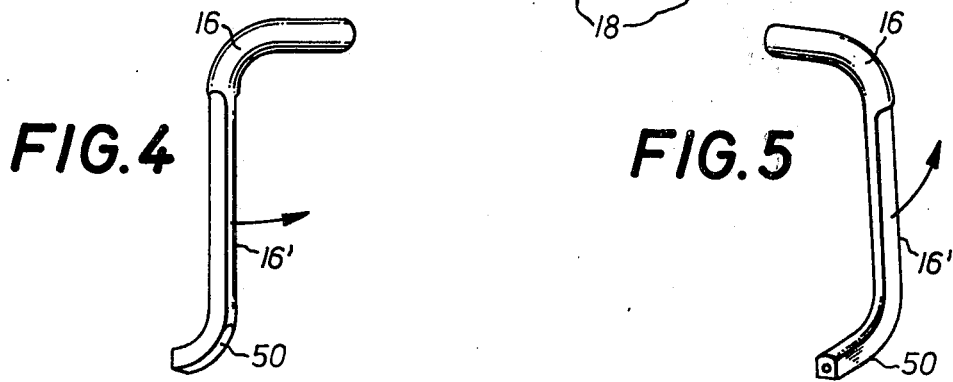

APPARATUS FOR WINDING WIRE COILS FOR ELECTRICAL MACHINES

BACKGROUND OF THE INVENTION

The present invention relates to an improved apparatus for winding wire coils for electrical machines. More particularly, the present invention relates to an improved coil winding apparatus of the type wherein the wires are initially wound on a slide core by means of a rotating flyer and then the wires, during the winding process are pushed onto a coil holder which is in engagement with the slide core.

It is known, e.g., from German Auslegeschrift (published Pat. Application) No. 1,589,860 published July 23, 1970 to produce coils for electrical machines by winding insulated wire on a slide core by means of a flyer. The term "slide core" is here understood to mean a stationary template which is provided with one or more flangeless steps on its periphery. Each one of these steps, which form a winding surface, includes a highly tapered section and a slightly tapered section with the direction of the taper extending toward the free end of the core. The wire is wound on the highly tapered surface section and slides from there to the less tapered section from where it is caused to finally slide off the core by further windings which are applied later. A coil receiving device directly engaged with the slide core catches the individual wire windings and combines them into coils.

With such a known winding device it is possible to produce a plurality of coils in which the connecting wires are not severed. However, the known winding devices, due to their particular type of structure, can produce only a single coil during one process step so that a relatively long period of time is still required to produce a complete winding including a plurality of coils.

It should additionally be noted that windings for electrical machines, particularly electromotors, are known in various types, such as, for example, windings with oppositely wound coils (Dahlander windings) or banked multilayer windings, particularly for motors with a large number of poles. The manufacture of simple, unbanked windings on coil winding machines according to the state of the art, which machines are provided with only one slide core, as already mentioned, is relatively time consuming. In the production of complicated windings by means of the prior art machines there exists the additional difficulty that the individual coils are wound on the machine and must then be additionally placed manually at the right spot on the coil holder or installation tool. Only in this way is it possible to wind and install the individual coils of a complicated winding continuously and without severing their connecting wires. The manual insertion, however, increases manufacturing costs to such an extent that it has seemed almost impossible to economically produce such windings.

SUMMARY OF THE INVENTION

It is the object of the present invention to improve winding devices of the known type. The improvement is intended to reduce the manufacturing time for the complete windings of an electrical machine as well as to permit the production of complicated, for example multilayer, windings by machine.

This is accomplished according to the present invention, in that the known coil winding apparatus including a support, a coil winding body in the form of a slide core mounted on the support, a flyer for winding the wire for the coil on the slide core, means for mounting the flyer on the support for relative rotation about the slide core, and a core holder which engages one end of the slide core during the winding process, is modified to further include a plurality of adjacently mounted slide cores which simultaneously engage the same coil holder during the winding process, a like plurality of flyers which are each mounted for relative rotation about a respective one of the slide cores, and means for simultaneously rotating the the flyers in synchronism with one another about the respective slide cores.

Thus, the basic principle of the present invention is that a plurality of, but at least two coil winding devices, each including a flyer, a slide core and possibly cutting devices, operate simultaneously to supply the same coil holder, i.e., the coil transfer and insertion device. The various specific structural features required to be able to realize this basic principle, will be discussed in detail in the description of the apparatus according to the invention.

BRIEF DESCRIPTION OF THE DRAWINGS

FIG. 2 is a plan view showing the association of the two slide cores of FIG. 1 with respect to one another and to the respective flyers and the coil holding or insertion device.

FIG. 3 is a partial side view, partially in section, of the subject matter of FIG. 2.

FIGS. 4 and 5 are two different perspective views of a preferred embodiment of the flyer.

DETAILED DESCRIPTION OF THE PREFERRED EMBODIMENTS

Figure 1:
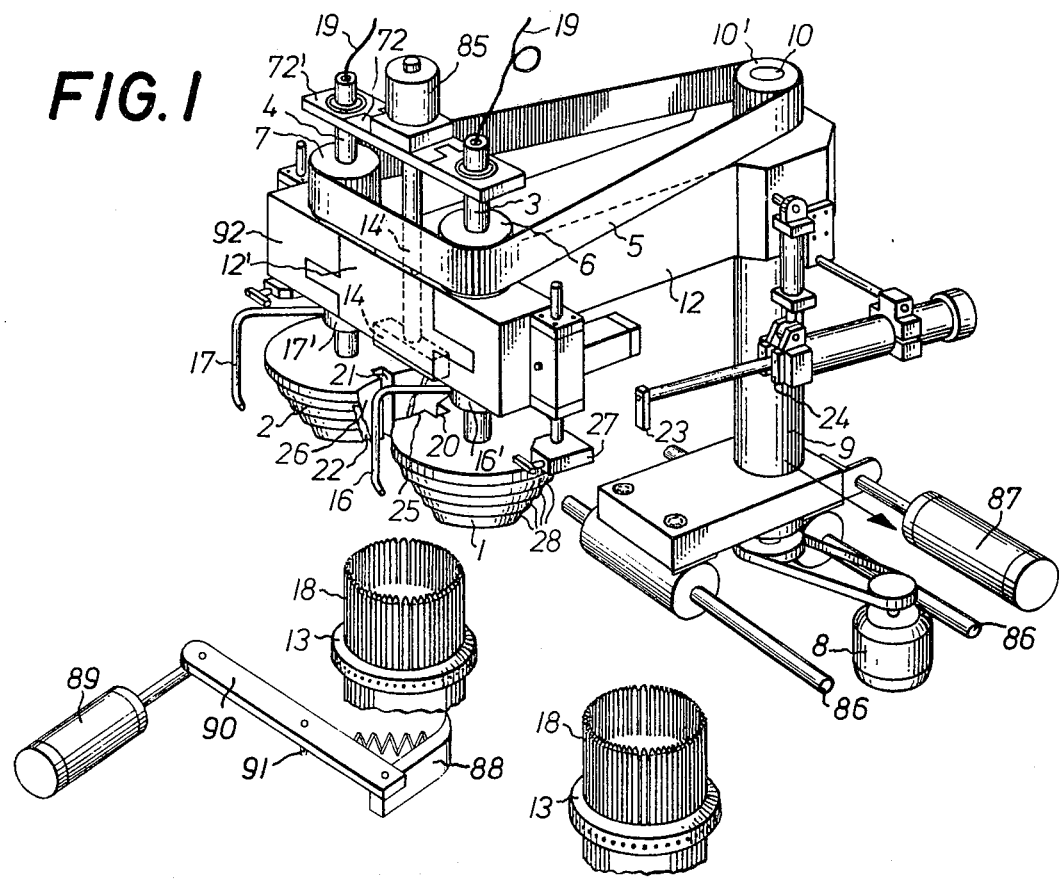
FIG. 1 is a schematic representation of one embodiment of a winding apparatus according to the invention which is provided with two slide cores.

Referring now to FIG. 1, there is shown a schematic representation of a winding apparatus according to the invention. The support for the apparatus includes a hollow column 9 which is fastened to a basic support frame (only a portion of which is shown) and which has, attached to its upper end, a crosspiece 12 having a front transverse portion 12'. A variable speed electric motor 8 disposed at the lower end of column 9 is connected to and drives a shaft 10 which is rotatably mounted in the interior of column 9. Permanently connected to the upper end of shaft 10 is a toothed wheel 10' which drives a toothed belt 5 which itself drives two toothed wheels 6 and 7 which are rotatably mounted on the top of the transverse portion 12'. Extending through the front transverse portion 12' and the toothed wheels 5 and 6 are a pair of hollow spindles 3 and 4 respectively. The spindles 3 and 4 are mounted so that they are free to rotate and are axially displaceable with respect to the front transverse portion 12' and are coupled to the respective toothed wheels 5 and 6, for example, by means of a spline connection, so that the spindles 3 and 4 are rotationally fixed but axially displaceable relative to the toothed wheels 5 and 6 respectively. Consequently the rotation of the shaft 10 by the motor 8 will be transmitted in a non-slipping and force-locking manner to the spindles 3 and 4 via the toothed wheel 10, the toothed belt 5 and the toothed wheels 6 and 7 respectively. The upper end bearings of spindles 3 and 4 are accommodated in a traverse 72.

It should be understood that the terms "upper" and "lower" as used throughout the application refer to an apparatus which is oriented so that the axial direction of spindles 3 and 4 is approximately vertical. With a winding apparatus arranged in this manner, there results the advantage that the sliding of the wire windings placed around the slide cores onto the coil holder is augmented by the influence of gravity. However, the present invention is not limited to an apparatus oriented in this manner.

Rotatably mounted at the lower free end of each of the two spindles 3 and 4, for example, by means of a bearing (not shown) are slide cores 1 and 2, respectively. Associated with each of the slide cores 1 and 2 is a respective flyer 16 or 17 respectively which is rotatably mounted on the transverse portion 12' by means of a rotatable joint 16' or 17' respectively. The spindles 3 and 4 extend through the joints 16' and 17' respectively and are coupled thereto, for example, by means of a spline connection, so that the spindles 3 and 4 are rotationally fixed but axially displaceable relative to the joints 16' and 17' respectively. Consequently rotation of the spindles 3 and 4 will cause the flyers 16 and 17 to rotate in a circular path about the respective slide cores 1 and 2.

Also mounted in the front transverse piece 12' of crosspiece 12 is a stripper 14 together with its drive rods 14' which extend to the traverse 72. The stripper 14 is disposed in the center of the transverse member 12' between the spindles 3 and 4 and is used simultaneously for both slide cores 1 and 2. The stripper 14 can be displaced to a plurality of defined positions in the axial direction of spindles 3 and 4 by means of a setting drive and can be arrested in each one of these positions. At a minimum, the stripper 14 is axially movable between a first or rest position as shown wherein the stripper 14 is retracted into the transverse member 12', a second position wherein the stripper is lowered and engaged with the recesses 20 and 21 for arresting the winding cores 1 and 2, and finally a third position wherein the stripper, when the total winding process is completed, is lowered to the free ends of the winding cores for stripping the remaining wire windings from the cores. The stripper is actuated by a setting drive which is arranged within the casing 85.

The slide cores 1 and 2 are each provided, for example, with four slightly conical steps 28 each of whose upper end is tapered more than the remaining portion. With two such slide cores it is possible, for example, to produce a two-strand winding in which each strand includes four concentric coils.

During the winding process, the two slide cores 1 and 2 engage and operate together on one of the coil holders 13 which are mounted on a support below the slide cores. In a preferred embodiment the coil holder is part of a complete coil insertion device, as described, for example, in U.S. Pat. No. 3,377,690, issued Apr. 16, 1968, to R. J. Eminger. The coil holders 13 each basically comprise a circular arrangement of insertion needles 18 whose geometry correspond to that of the lamination packet into which the wound coils are to be inserted. The association of the slide cores 1 and 2 relative to the coil holder 13 is shown in FIG. 2. As shown, the arrangement according to the invention is such that the slide cores 1 and 2 are disposed above the insertion needles 18 and extend in part into the circle formed by these needles. The center axes 73 and 74 of the slide cores 1 and 2 respectively, which have a circular cross section, are both disposed on a common partial circle 75 whose center axis coincides with that of the coil holder 13. It should be noted at this time that as shown in FIG. 3, the lower surface of each of the winding cores 1 and 2 is provided with an axial recess 22 which fits over and engages a portion of the insertion needles 18 during the winding process so that the winding cores 1 and 2 are not free to rotate during the winding process.

During the winding process, the wire windings simultaneously wound onto the slide cores 1 and 2 slide between the insertion needles 18 of the coil holder 13 and thereafter are pushed from there directly into the grooves of the lamination packet which will later be placed onto the insertion needles 18. Each coil winding apparatus has associated with it a plurality of, but at least two, complete coil holders or insertion devices which are each provided with a complete set of coils in succession. These coil holders or insertion devices may be disposed, for example, on a turntable or — as shown in FIG. 1 — they may advantageously be permanently installed next to one another while the coil winding apparatus swings between the two coil holders or insertion devices. For this purpose, the entire coil winding apparatus together with its drive is arranged to be displaceable on one or a plurality of rails and is moved by means of a setting drive from the one operating position in which the slide cores 1 and 2 are associated with one of the coil holders to the other operating position in which the slide cores are associated with the other coil holder. This produces the advantage, when insertion devices of the type described in the above-mentioned patent are used that the complex insertion devices need not be moved on a circular path and the coil holders need not be separate from the associated insertion devices so that the expenditures for this operation are considerably reduced.

The rails 86, on which the coil winding apparatus slides, are arranged in parallel with the common center axis of coil holders 13. Along these rails 86 the coil winding apparatus is adapted to be displaced to two rest positions, where the slide cores are brought into engagement with one of the coil holders 13. A setting drive 87 moves the coil winding apparatus from the first rest position to the second.

The slide cores themselves — as shown in FIG. 3 — are provided as mentioned above with one or a plurality of short steps 28 as required on their periphery which steps have a taper of about 45° in their upper portion 28' so that the wire wound onto this portion of the step, which serves as the winding surface, will slide downwardly as a result of the tension produced in the longitudinal direction of the wire. This portion changes toward the bottom in a soft curve to a portion 28'' which is only slightly tapered, i.e., preferably within the range of from 0.5° to 5°. From this slightly tapered portion 28'' the individual wire windings are caused to slide downwardly by the subsequently wound windings on the slide cores 1 and 2 or by the stripper 14, respectively, where they then fall into their assigned slits between the insertion needles 18 of the coil holder 13.

As further shown in FIG. 3, the wire 19 required to produce the coils runs through the spindles 3 and 4, which have the shape of hollow shafts, and passes from there via openings in the joints 16' and 17' through the flyers 16 and 17 respectively. The flyers 16 and 17 are preferably thin multiply bent tubes. The winding plane of each flyer always remains at the same level slightly above the end of the insertion needles 18 so that the individual steps 28 of the slide cores 1 and 2 must be brought into the winding plane. This is done by displacing the spindles 3 and 4 in the direction of their longitudinal axis by means of a setting drive and arresting the displacing mechanism in the corresponding winding position.

Three setting drives are arranged in the casing 85. One of them is provided for moving the traverse 72 up or down. The upper end bearings of spindels 3 and 4 are supported by the traverse 72, so that the spindles are movable between the two rest positions. Together with the spindles 3 and 4 the slide cores 1 and 2 are to be moved between the two rest positions to bring the slide cores into engagement with one of the coil holders 13. The second and the third setting drive are provided for moving the stripper to one of those three positions described above.

Each of the coil holders 13 is mounted so that it can be rotated round its center axis within an angle corresponding to a predetermined number of slot pitches upon completion of a coil and before beginning of winding of a further coil. To control this rotation the circumference of each coil holder 13 is provided with a number of equally spaced notches which are engaged by a ratchet 88. The ratchet 88 is operated by means of setting drive 89 via a lever 90 which is rotatably mounted on a pivot 91.

In order for the spindles 3 and 4 to be able to rotate with respect to the slide cores 1 and 2 respectively, as mentioned above the slide cores are rotatably mounted on the ends of the spindles. It is necessary, however, to secure the slide cores 1 and 2 against undesired twisting or rotation as long as they are in their rest position, i.e., when not in engagement with the coil holder 13. This is advantageously done according to the invention by means of stripper 14. For this purpose the stripper 14 is provided with lateral extensions which snugly engage in axial recesses 20 and 21 provided in the peripheries of the slide cores 1 and 2 respectively when the stripper 14 is lowered from its rest position. This engagement is continued as long as the slide cores 1 and 2 and the insertion needles 18 are out of engagement and the flyers 16 and 17 are standing still.

Prior to the start of the winding operation, the thus arrested slide cores 1 and 2 are lowered so that the respective steps 28 with the smallest diameter are in the winding plane as shown in FIG. 3. In this position the insertion needles 18 already firmly engage in the recess 22 of each slide core 1 and 2 and thus arrest it against rotation. Consequently the stripper 14, which would block the circular path of the flyers 16 and 17 now can be removed from the recesses 20 and 21 and moved upwards into its rest position without the slide cores 1 and 2 being able to rotate relative to the coil holder 13.

The free end of the wire 19 which is to be placed onto the slide cores 1 and 2 is held at each slide core, before the winding begins, by a wire catcher 23 (FIG. 1) which is coupled with a cut-off device 24 and which can be shifted by means of a setting drive into the circular path of the associated flyer, and thus into the path of the wire, to grip the wire and return with the wire to its rest position.

The winding process is initated in that thereafter spindles 3 and 4 are caused to rotate by means of motor 8 so that the flyers 16 and 17 are moved around the slide cores 1 and 2 respectively. The structure of the device advantageously permits a number of revolutions of the spindles 3 and 4 and thus of the flyers of up to about 5000 per minute or more.

The circumference of the slide cores 1 and 2 or of their individual steps 28, respectively, depends directly upon the diameter of the coil which is to be wound. This again depends on the bore diameter and the length of the lamination packet as well as on the position of the coil in the packet, i.e., on its width. The cross section of each slide core 1 or 2 at the level of the winding surface may be circular or oval, elliptical or otherwise. The axis of the associated spindle 3 or 4, respectively, may also lie outside of the geometrical center of the respective cross-sectional (see for example FIG. 3) so that the center of the circular path of the flyer encircling the slide core need not coincide with the geometrical center of the respective slide core.

As can be seen in FIG. 2, in the illustrated embodiment the two coils to be wound at their greatest width are separated from one another only by the width of a tooth of the lamination packet to be wound. In order to be able to produce such closely adjacent coils simultaneously by means of the slide cores 1 and 2 which work with a correspondingly designed insertion device, it is of course necessary to place the slide cores 1 and 2 just as closely together. For a winding device in which the wire forming the coils slides directly between the insertion needles 18 of the associated coil holder, this means that the corresponding winding surfaces of the slide cores are disposed at those points of their periphery which are disposed directly above the insertion needles, and are spaced only at a distance which approximately corresponds to the width of one insertion needle. The flyers which encircle the slide cores must be guided through this narrow passage.

The flyers 16 and 17 move around the slide cores 1 and 2 on a circular path. The diameter of this circular path, however, cannot be selected large enough, for space saving reasons, so that the circular paths of the flyers encircling two adjacent slide cores will not intersect in the area above the circle formed by insertion needles 18. In order to provide the necessary space, according to the present invention the adjacent surfaces of the slide cores 1 and 2 are provided with recesses 25 and 26, respectively. These recesses 25 and 26 form a section which is adapted — as shown in dashed lines — to the circular path of the flyer 16 or 17, respectively, which encircles the adjacent slide core 1 or 2.

The wire 19 wound on the slide cores 1 and 2 bridges the recesses 25 and 26 and forms a chord with respect to the recesses 25 or 26, respectively which recesses have the shape of a circular sector. It has been found that such a winding core will not exert any negative influence on the winding speed or on the quality of the thus produced winding even if recesses 25 or 26, respectively are relatively large. The edges formed between the recesses 25 and 26 and the periphery of the cores 1 and 2 are rounded to prevent damage to the wire.

Due to the narrow space between adjacent slide cores 1 and 2, the circular paths of the flyers 16 and 17 pass only a slight distance from the greatest circumference of the associated slide cores. Since the circular paths overlap, the flyers must be positively guided or synchronized. This is advantageously effected by means of a toothed belt 5 which drives spindles 3 and 4 and which constitutes a very simple means for solving this problem.

FIG. 2 also shows that the wires which span recesses 25 or 26, respectively, in the form of a chord lie in the path of flyers 16 and 17 which path is shown by dashed lines. For example, in the illustrated positions, flyer 16 has completed only half its path around slide core 1 when flyer 17 passes recess 25. After this short path of flyer 16, the wire 19 still has too much tension and has not as yet slid downwardly from core 1 to release the path for flyer 17. This problem, which is a result of the unavoidable spatial proximity of the two slide cores 1 and 2, is solved by the present invention in that the leading edge of the free ends of the flyers 16 and 17 are designed as positive strippers for the wire. For this purpose, as shown in FIGS. 4 and 5, the curved end portions 50 of the flyers 16 and 17 which come in contact with wire 19 are rounded at their undersides and flattened so that the wire can be softly gripped and pressed downwardly a small amount without damage. This additionally produces the quite desirable effect that the windings dependably slide off the slide core and fall between the insertion needles 18 without jamming.

In order to realize perfect operation of the apparatus at the desired high winding speeds and with the small space between the slide core and the flyer, a flyer has been developed which is completely novel in design and which has a just as novel a drive and wire input. The flyers are preferably designed as thin and flat tubes which are curved several times and have a width which is less than that of an insertion needle 18. The free lower ends of the flyers 16 and 17 serve as the wire exit nozzles. Each flyer 16 and 17 is fastened at its upper end, as described above, to the joint 16' or 17' associated with the spindle attached to the associated slide core. The wire 19 passes through the spindle 3 or 4 which has the shape of a hollow shaft and is directly introduced into the interior of the flyer 16 or 17. For this reason a preferred embodiment provides that each flyer 16 or 17 have the approximate shape of a Z with the center portion 16' being approximately axially parallel with the associated spindle 3 or 4, but with its upper and lower ends, however, not being axially parallel to one another but rather offset by about 90° with respect to one another in parallel planes. The lower arm forming the wire exit nozzle is bent so that the wire, which exits therefrom in a straight line approximately in the direction of the arm axis, forms a tangent to the periphery of the associated slide core. The curvatures of the flyer between the various arms are gradual curves to prevent damage to the wire.

When the winding process for a coil of a certain diameter has been completed, stripper 14 is lowered from its rest position into recesses 20 and 21 of the slide cores until it reaches their lower end. Wire windings which may still hang on the slide cores 1 and 2 are hereby pressed downwardly so that they slide off of the slide cores 1 and 2 and fall into the slits of the coil holder 13. Thereafter multi-step slide cores 1 and 2 are brought into another position relative to the flyers 16 and 17. This is preferably done by axially displacing the spindles 3 and 4 by means of a setting drive and arresting the spindles in the new winding position by means of a further setting drive. Then stripper 14 is returned to its rest position. However, if the total winding process is completed, and thus the coil holder 13 is disengaged from the slide cores 1 and 2, the stripper 14 remains in engagement with the slide cores 1 and 2 as long as the latter are disengaged from the coil holder, i.e., the ring of insertion needles 18 is not engaged in the grooves 22. Single step slide cores are brought into another position relative to the ring of insertion needles 18 when the winding process is completed as will be explained in detail below.

The coils which are produced in a continuous sequence on the individual steps of the slide cores are wound so that the wire connecting the coils is not severed. In order to produce a loop of sufficient length between two coils, wire 19 is held by the loop former 27 (FIG. 1) upon completion of winding of the first coil until the beginning of winding the second coil. The loop former 27, for example, is a hook which can be moved by means of a plurality of setting drives and which can be moved into the winding area to such an extent that it can grip the piece of wire between the flyer and the end of the coil and can then return to its rest position with that piece of wire. The piece of wire is held there until a given point in time during the further course of the winding process. This measure additionally assures that at the beginning of winding of the second coil, the wire connection to the first coil is not pulled taut. The loop former 27 releases the wire when a few windings have been completed on the second coil.

According to the present invention, a multistrand winding is produced by means of a special slide core for each strand. This makes it possible inter alia, in an advantageous manner, to produce even very complicated windings by machine and — for all types of completed windings — to substantially reduce production times. Windings of the type to be described below could be produced on winding machines of the prior art only by manually inserting the coils which were wound on a single slide core into the coil receiving device or holder in the sequence intended for the particular windings. Moreover, it was then usually necessary to sever the connections between the individual coils and, after the coils had been inserted into the lamination packet, to reconnect them.

Figure 6:
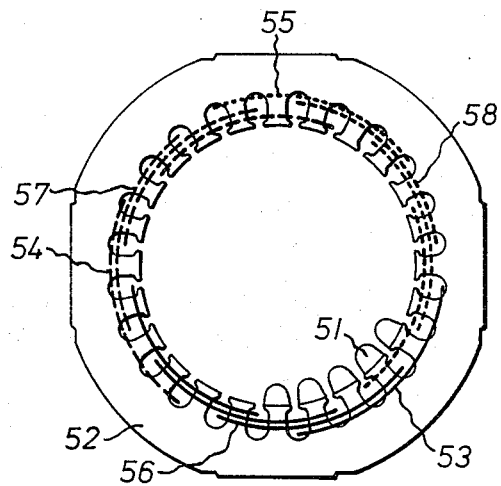
FIG. 6 is a schematic representation of a three-phase winding for a four-pole electric motor.

Turning now to FIG. 6 there is shown such a winding as mentioned above which is a three-strand, four-pole multiple layer winding, with the strands of winding with adjacent winding head levels being wound in opposite directions with respect to one another and the end coils of the oppositely wound winding strands being adjacent the starting coils of the other winding strands. With such a winding there results the great advantage that possible voltage differences between adjacent winding portions from the star-point voltage are reduced while the conventional windings not infrequently produce voltage differences up to the level of the line voltage. The danger of voltage breakthroughs in the area of the winding head is thus substantially reduced and the motor windings can be produced with less expenditures for insulation while the electrical safety remains unchanged.

Figure 7:
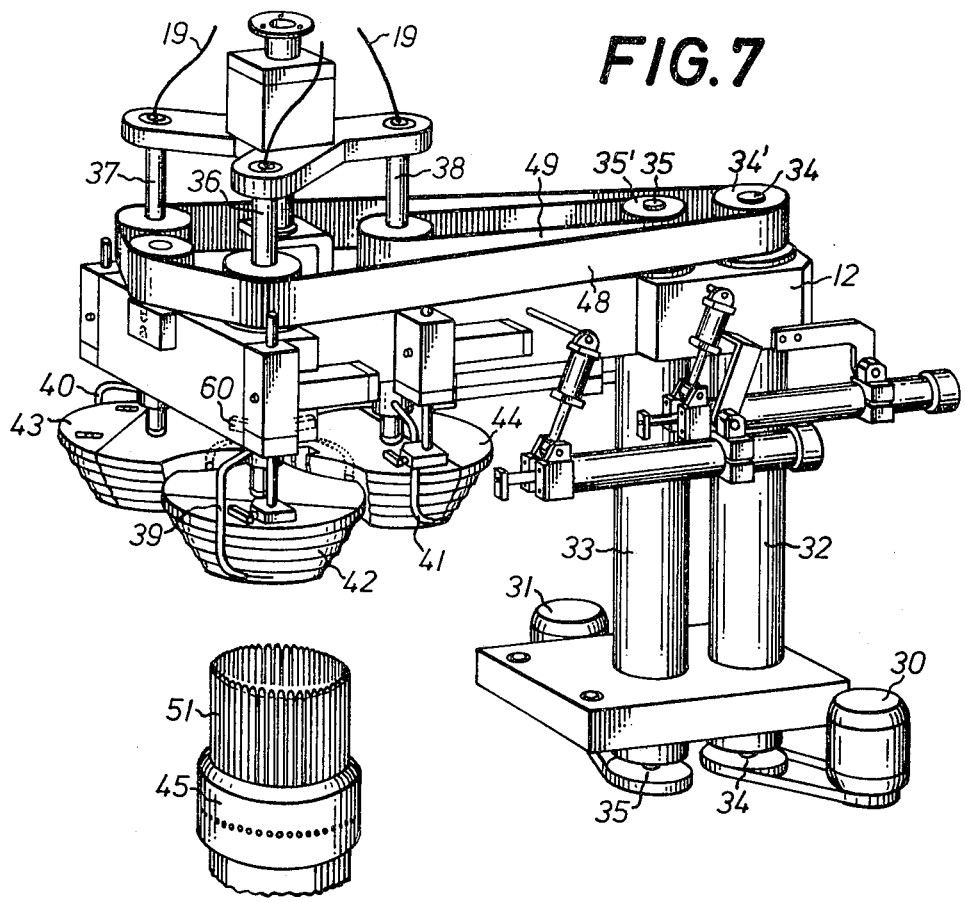
FIG. 7 is a schematic representation of another embodiment of a winding apparatus according to the invention which is provided with three slide cores.

According to the present invention, such a winding is produced with the winding apparatus shown in FIG. 7. The winding apparatus is provided with three slide cores 42–44 which may have one or a plurality of steps and are rotatably mounted at the ends of spindles 36–38 respectively. In order to produce the windings of FIG. 6, it is sufficient to have single step slide cores.

The apparatus shown in FIG. 7 with three slide cores corresponds in its significant components to the structure of the apparatus described in connection with FIGS. 1 to 3 and will be described in connection with FIGS. 7 to 9.

The apparatus is driven by means of the two variable speed electromotors 30 and 31 which cause the shafts 34 and 35 rotatably disposed in columns 32 and 33 to rotate. The shaft 34 is coupled via toothed belt 48 and associated toothed wheels to the spindles 36 and 37 while the shaft 35 is coupled via toothed belt 49 and associated toothed wheels to the spindle 38. Via these toothed wheels and toothed belts 48 and 49, spindles 36, 37 and 38 are caused to rotate and thus flyers 39, 40 and 41 are caused to rotate in a circular path around slide cores 42, 43 and 44 respectively. The three slide cores operate together and simultaneously with the coil holder or insertion device 45. FIG. 8 shows the association of the slide cores 42–44 with one another and with the coil holder 45. The center axes 77, 78 and 79 of the circles described by flyers 39, 40 and 41 respectively are disposed at regular intervals, i.e., with a spacing of 120°, on a partial circle 80. The center axis of this partial circle 80 is coaxial with the center axis of the circle formed by the insertion needles 51 of the coil holder. The insertion needles 51 are preferably part of a complete coil insertion device as discussed above. The coil winding apparatus may also advantageously be designed so that, as also discussed above, it alternatingly serves a plurality of coil holder or insertion devices.

Figure 8:
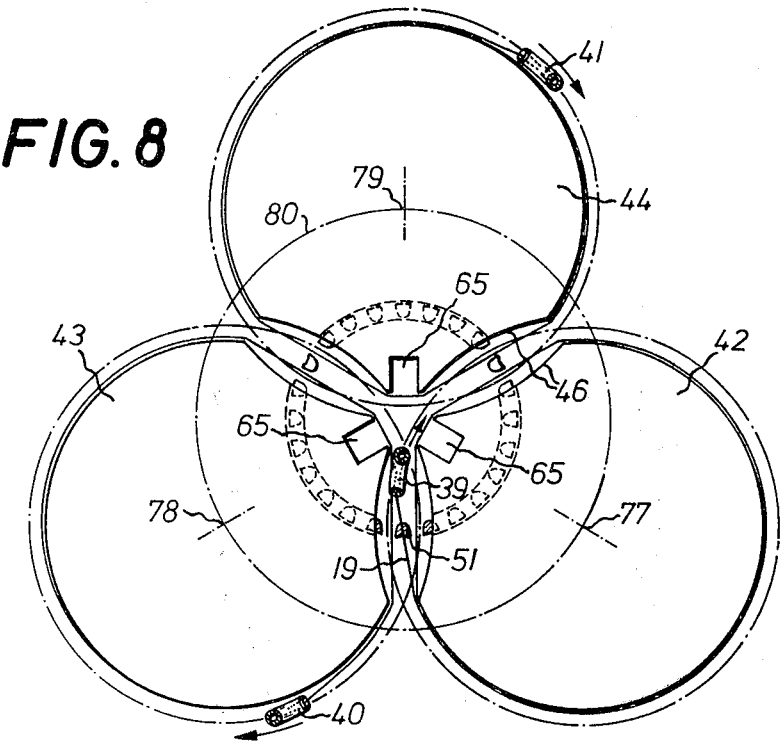
FIG. 8 is a plan view showing the association of the three slide cores of FIG. 7 with respect to one another and to the respective flyers and to the coil holder or insertion device.

The slide cores 42, 43, and 44 shown in FIG. 8 in a schematic plan view serve to produce a three-strand winding where the coils with the greatest width lie in immediately adjacent grooves of the lamination packet. Consequently, the slide cores 42–44 are separated or laterally spaced from one another only by the width of one tooth of the lamination packet to be wound. In order to obtain the required room for the circular paths for flyers 39, 40 and 41 in this embodiment the slide cores 42–44 are each provided with two peripheral recesses 46 in the form of circular sectors. The number and size of these recesses here likewise depends on the diameter of the circular paths of the flyers 39–41. The stripper (not shown), as in the embodiment of FIG. 1, is preferably designed as a single component which is associated with all three slide cores 42–44 and is introduced into the additionally provided axial recesses 65 in each slide core in order to completely strip off the wire windings upon completion of the winding process as well as to temporarily arrest the slide cores when they are not in engagement with the coil holder 45.

In this embodiment of the winding apparatus, as with the embodiment of FIG. 1, the flyers 39–41 are also designed so that the wire 19, which exits in the direction of the nozzle end, forms a tangent to the periphery of the associated slide cores 42–43 and the portions of the flyers 39–41 which engage in the recesses 46 serve as positive strippers.

Figure 9:
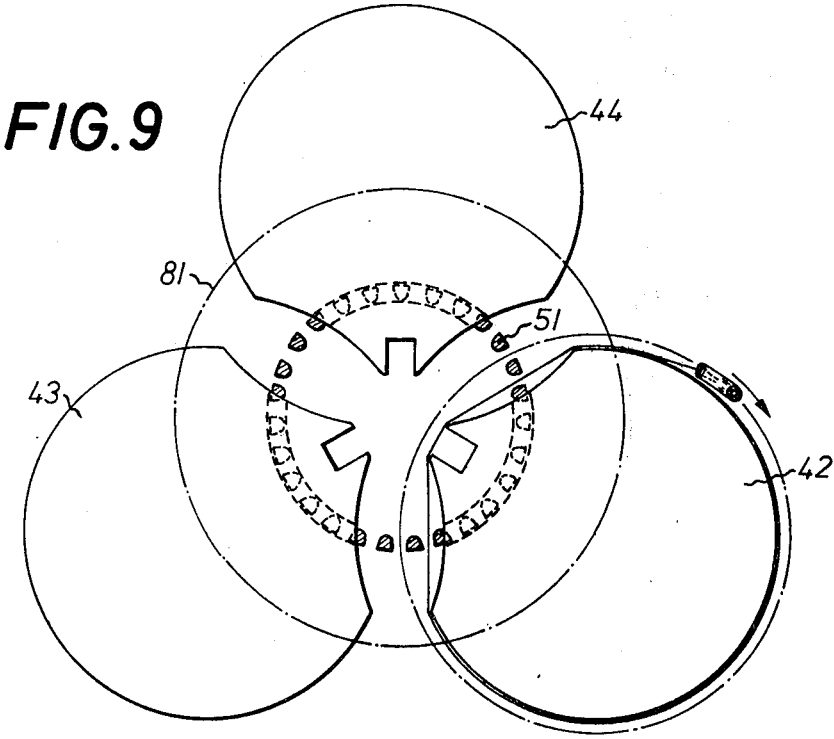
FIG. 9 is a plan view showing a modified version of the arrangement of FIG. 8.

FIG. 9 shows the slide cores 42, 43 and 44 disposed on a partial circle 81 with a diameter greater than that of partial circle 80 (FIG. 8). Thus in this arrangement the slide cores 42–44 are farther removed from one another and fewer insertion needles 51 are covered by each of the slide cores. As a result, the width of the coils produced in this manner is less. In order to be able to adapt the diameter of the coils to the changed width, slide cores are advantageously used which are of the type shown in FIG. 12. Such a slide core is formed of two half cores 82 and 83 which are laterally displaceable with respect to one another. In order to secure the two core halves 82 and 83 relative to one another, screws 84 are provided. In order to vary the partial circle diameter, there advantageously exists the possibility, which is not shown in detail but which can be realized with means known to the person skilled in the art, of arranging the slide cores to be displaceable with respect to the spindles or of making the spindles including the slide cores fastened thereto displaceable with respect to the crosspiece 12 or its front transverse piece 12', respectively, in a direction radial to the circle of the insertion needles.

The transverse piece 12' as well as the traverse 72 consist of an inner main part and two outer parts 92 or 72' respectively. These parts are laterally displaceable with respect to one another. Projecting parts are arranged between the inner and the outer parts of the transverse piece and the traverse. In order to permit this displacement, rectilinear dovetail grooves are provided. It is necessary to displace the slide cores radially, if the coil holders are interchanged and coil holders having a greater diameter are utilized.

The winding as shown in FIG. 6, which comprises a plurality of coils of identical width is produced with the slide cores 42–44 arranged as shown in FIG. 9. It is here sufficient to give the slide cores but one step. Due to the separate drives for the spindle 38 and the associated flyer 41 as shown in FIG. 7, it is possible to cause flyer 41 to rotate in a direction opposite to the direction of rotation of the two flyers 39 and 40 so that the coil produced on the associated slide core 44 is wound opposite to those produced on the other two slide cores 42 and 43.

Figure 12:
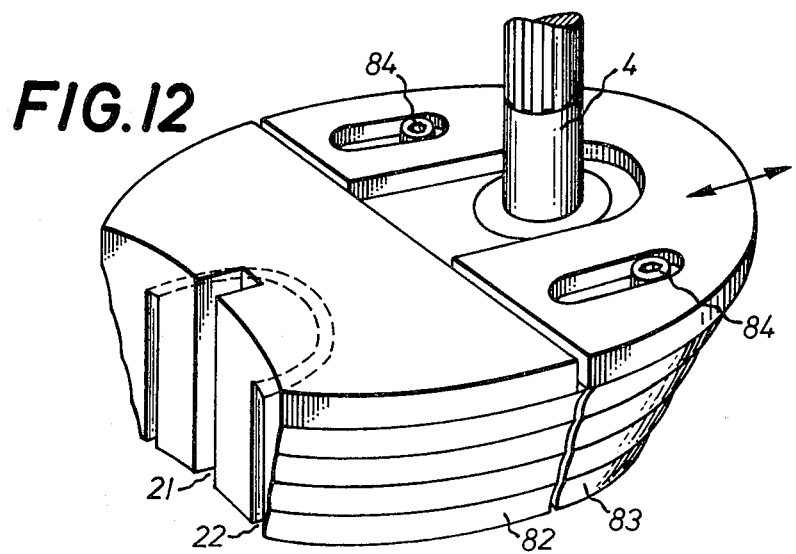
FIG. 12 is a perspective view of a slide core having a variable diameter.

The winding which is inserted into the lamination packet 42 as shown in FIG. 6 is produced in that first coils 53, 54 and 55 are simultaneously wound, each on one slide core. Thereafter the ring of insertion needles 51 of the insertion device 45 is rotated counterclockwise by two groove steps with respect to the slide cores and, without severing the connection between the individual coils, coils 56, 57 and 58 are then produced. When they are completed and the ring of insertion needles 51 has been turned again, the remaining coils of the winding are produced in the same manner. The now completed winding is already disposed between the insertion needles 51 and can be inserted, immediately upon removal of the winding apparatus to the adjacent coil holder or insertion device and upon placement of the lamination packet 52 on the insertion needles 51, in the grooves of the lamination packet. In order to be able to rotate the ring of insertion needles 51 relative to the slide cores 42–44 as long as they are in engagement with one another, recess 22 is given the shape of a circular ring sector, as shown in FIG. 12.

Figure 10:
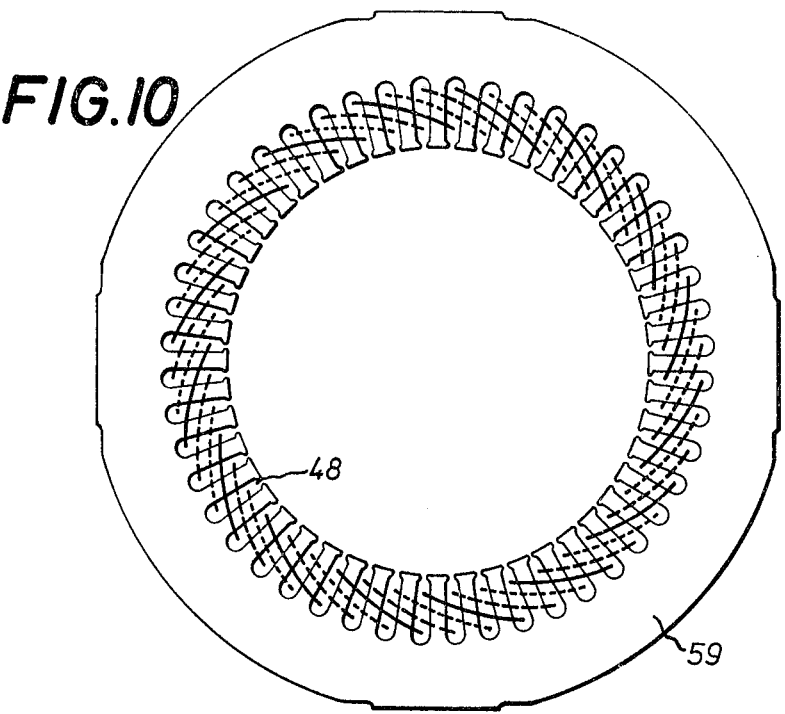
FIG. 10 is a schematic view of a three-phase winding for a 24 pole motor.
Figure 11:
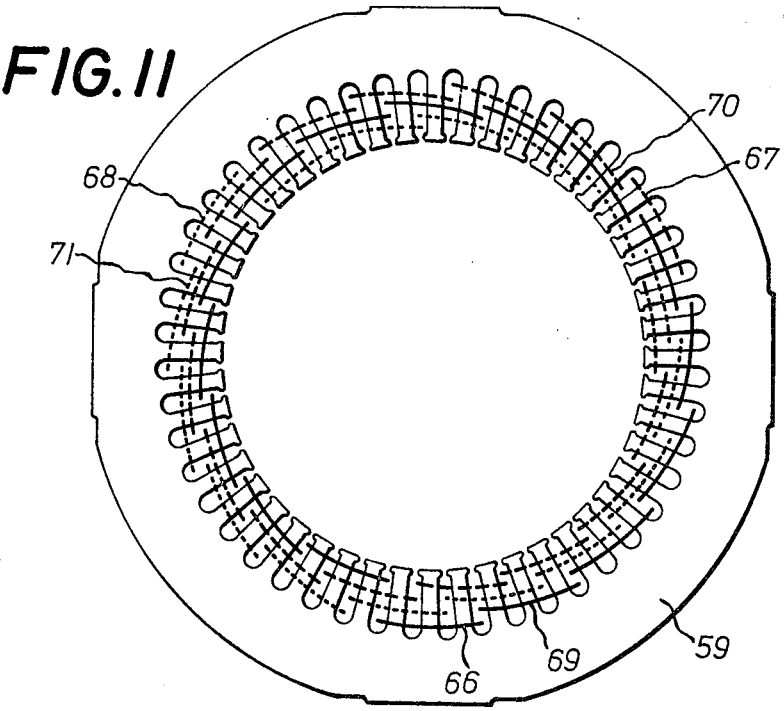
FIG. 11 is a modified scheme of the arrangement of FIG. 10.

FIGS. 10 and 11 give further examples of how the winding device of FIG. 7 according to the invention can realize a significant technical advance as compared to the state of the art.

The three-strand winding according to FIG. 10 includes 16 coils per strand which are accommodated in 48 grooves of the lamination packet 59 and form 24 poles. The winding is nested in itself and designed as a multiple layer winding. If the coils are wound, in the conventional manner according to the state of the art, individually for each strand but without severing the connections therebetween so that the coils of each strand are disposed on a separate transfer tool, then a plurality of workers are required to insert these coils into the insertion device in the desired sequence. This necessity is a result of the fact that six individual coils must be manually moved or held, respectively, at the same time. If the number of workers required is to be reduced, the connections between the individual coils must be severed and the coils must be reconnected after they have been inserted into the lamination packet. In both cases the expenditures are considerable so that the economical production of such a winding is questionable.

The advantages of a winding according to FIG. 10 are that the coils have the same width and are designed symmetrically as regards their electrical as well as mechanical parameters. This results in good utilization of material, quiet running of the motor and an absolutely uniformly configured winding head. In order to make possible the production of such a winding by machine, the winding must be slightly modified as shown in FIG. 11. The winding of FIG. 11 begins with coils 66, 67 and 68. When they are completed, the ring of insertion needles of the insertion device is rotated clockwise relative to the slide cores by three groove steps and then coils 69, 70 and 71 are produced, and after a further rotation by three more groove steps the further coils are wound. As can be seen in FIG. 11, a winding is produced in this way which has its coils overlapped in the same manner as the coils shown in FIG. 10 and with only the winding levels being interchanged in some places. The coil shown in FIG. 11, however, has the same advantages, i.e., symmetry and uniform winding heads, as the winding of FIG. 10. Additionally there is the advantage that this winding can be produced fully automatically and the time required for this process is less than the time required to produce the coils of but a single strand with the devices of the prior art and insert them into the insertion device.

In order to make the winding device universally applicable, the present invention further provides that the spindles may be fastened to the crosspiece 12 or to its front transverse portion 12', respectively, so that they are displaceable on a section of a partial circle whose center coincides with that of the ring of the insertion needles of the coil holder. With such a winding device it is possible to produce coils for special types of windings, such as, for example, auxiliary and supplemental windings in an advantageous manner. The spindles can be fastened in circular arc section type recesses of the crosspiece 12 or of its front transverse piece 12' in the usual manner known to the person skilled in the art. It is also conceivable to make the individual arms of the transverse portion 12' of the crosspiece displaceable themselves in which case the flyer which encircles the slide cores at a further distance retains its axis of rotation.

It is further possible, within the scope of the present invention, to associate four and more slide cores to one coil holder or insertion device if this is required for the winding to be produced and if the bore diameter of the lamination packet to be wound as well as the diameter of the coils to be wound can be accommodated in the available space. It is also conceivable to simultaneously wind slide cores with different diameters.

In order not to have to exchange flyers when the spindles change their direction of rotation, the flyers are advantageously designed in the manner of a pivotable nozzle so that they will automatically set themselves in the proper direction of rotation.

The setting drives for the individual components of the device which can be moved into various positions are advantageously hydraulically operated pistons which can be displaced within cylinders. The associated magnetic valves are actuated by means of signals produced electronically in a servo control. However, any other type of motion control is conceivable within the scope of the present invention.

It will be understood that the above description of the present invention is susceptible to various modifications, changes and adaptations, and the same are intended to be comprehended within the meaning and range of equivalents of the appended claims.

What is claimed is:

1. In an apparatus for producing coils for electrical machines, said apparatus including a support, a coil winding body in the form of a slide core mounted on said support, a flyer for winding the wire for the coil on said slide core, means for mounting said flyer on said support for relative rotation about said slide core, and a coil holder engaging one end of said slide core during the winding process, whereby the wire windings are formed on said slide core by the rotation of said flyer about said slide core and the major portion of the wire windings is pushed, during the winding process, onto said coil holder; the improvement comprising: a plurality of said slide cores mounted adjacent one another on said support and simultaneously engaging the same said coil holder during the winding process; a plurality of said flyers, each mounted on said support for rotation about a respective one of said slide cores; and means for simultaneously rotating said flyers in synchronism with one another about the respective said slide cores whereby a plurality of the coils for a complete winding may be simultaneously wound.

2. Apparatus as defined in claim 1 wherein said plurality of adjacent slide cores are mounted on said support sufficiently close together so that the circular path of the flyer associated with one of said slide cores would normally intersect the periphery of the adjacent said slide core, and wherein each of said slide cores is provided with a peripheral recess corresponding to the intersecting portion of the circular path traveled by the one of said flyers rotating about the adjacent said slide core, whereby said plurality of flyers may freely rotate about their respective slide cores.

3. Apparatus as defined in claim 2 wherein: each of said slide cores is rotatably mounted at its end opposite said one end of an axial hollow spindle; means are provided for mounting each of said spindles on said support so that each of said spindles is rotatable about and displaceable along its longitudinal axis; and said means for mounting said flyer includes means for securing each of said flyers to the associated one of said spindles for rotation therewith while maintaining the said circular path of said flyer about the associated said slide core a constant axial distance from said coil holder.

4. Apparatus as defined in claim 3 wherein: the smallest possible lateral distance between adjacent said slide cores which are in engagement with the same coil holder corresponds approximately to the width of a tooth of the lamination packet to be provided with the coils being wound or to the width of an insertion needle of the associated coil holder respectively; the width of the cross section of the portion of each said flyer which is moved between said adjacent slide cores is less than said smallest possible lateral distance between said slide cores; and the free end of each said flyer is shaped so as to constitute a positive stripper for the wire wound on the adjacent said slide cores.

5. Apparatus as defined in claim 4 wherein each said flyer is a thin tube with a flat, possibly oval or rectangular, cross section and is bent in the approximate shape of a Z with one arm extending approximately radially to the associated spindle and connected to said means for mounting said flyer, its center arm extending approximately parallel to said longitudinal axis of said spindle, and its free arm, which forms the wire exit nozzle, extending from said center arm approximately perpendicular to the axis of said one arm, said free arm being oriented approximately tangent to the circumference of the winding surfaces of the associated said slide core.

6. Apparatus as defined in claim 5 wherein the surface of said free arm of each said flyer which faces said coil holder is flattened and joins said center arm in a gentle curve.

7. Apparatus as defined in claim 3 wherein said means for simultaneously rotating said flyers includes: an electric motor; a shaft rotatably mounted on said support and driven by said motor; and a common coupling means for connecting said shaft to said spindles in a non-slipping and force locking manner.

8. Apparatus as defined in claim 7 wherein said common coupling means is a toothed belt drive.

9. Apparatus as defined in claim 3 wherein said means for simultaneously rotating said flyers includes: a plurality of electric motors; a plurality of shafts rotatably mounted on said support and each connected to and driven by a respective one of said motors; and coupling means for connecting each of said spindles to one of said shafts in a non-slipping and force locking manner.

10. Apparatus as defined in claim 9 wherein said coupling means include a plurality of toothed belt drives each connecting one of said shafts to at least one of said spindles.

11. Apparatus as defined in claim 9 wherein said means for simultaneously rotating said flyers causes at least some of said flyers to rotate about their respective slide cores in opposite directions of rotation.

12. Apparatus as defined in claim 3 wherein the periphery of each of said slide cores is provided with a plurality of winding steps of different diameter; and further comprising means for axially displacing the spindles associated with the respective slide cores to position the desired one of said plurality of winding steps in the associated winding plane defined by the circular path of the associated one of said flyers.

13. Apparatus as defined in claim 3 further comprising: a recess formed in the periphery of each of said slide cores and extending from said opposite end parallel to the longitudinal axis of said spindle; a stripper for each of said slide cores; means for mounting said stripper on said support for displacement parallel to the longitudinal axis of the associated said spindle; a projection on said stripper which can matingly and force-lockingly engage said axial recess on the associated said slide core; and means for selectively displacing said stripper between a first position wherein said projection does not engage said axial recess on said slide core and a second position wherein said projection is force-lockingly engaged in said axial recess of said slide core.

14. Apparatus as defined in claim 13 wherein a common stripper is provided for all of said slide cores, said common stripper being provided with a plurality of said projections which simultaneously engage in respective said axially parallel recesses in all of said slide cores in a force-locking manner.

15. Apparatus as defined in claim 13 wherein said means for selectively moving said strippers moves same to said second position whenever said slide cores are out of engagement with said coil holder.

16. Apparatus as defined in claim 3 including at least three of said simultaneously windable slide cores.

17. Apparatus as defined in claim 3 wherein: said coil holder includes a ring of insertion needles; and each of said slide cores is provided with an arcuate recess on said one end thereof which covers and engages a portion of said ring of insertion needles during the winding process.

18. Apparatus as defined in claim 3 including two of said simultaneously windable slide cores with the center axes of said slide cores being disposed on a common partial circle whose center axis is coaxial with the axis of said coil holder.

19. Apparatus as defined in claim 3 including three of said simultaneously windable slide cores with the center axes of said slide cores being disposed, offset by 120° with respect to one another, on a common partial circle whose center axis is coaxial with the axis of said coil holder.

20. Apparatus as defined in claim 3 including a plurality of said slide cores with the center axes of said slide cores being disposed, at desired angular spacings with respect to one another, on a common partial circle whose center axis is coaxial with the axis of said coil holder.

21. Apparatus as defined in claim 3 including a pair of said coil holders; and means for alternatingly bringing said slide cores into engagement with one of said pair of coil holders.

22. Apparatus as defined in claim 21, wherein: said coil holders are stationary and said means for alternatingly bringing said slide cores into engagement with one of said pair of coil holders includes means for moving said support relative to said coil holders.

23. Apparatus as defined in claim 21 wherein each of said coil holders is mounted so that it can be rotated about its center axis by a plurality of slot pitches upon completion of a coil and before the beginning of winding of a further coil.

24. Apparatus as defined in claim 3 further including means for radially displacing the individual said slide cores with respect to the ring of insertion needles of said coil holder.

25. Apparatus as defined in claim 3 wherein said spindle is attached to said one end of the associated said slide core outside of the geometric center of the cross section of said associated slide core.

26. Apparatus as defined in claim 3 wherein each of said slide cores is formed of two half slide cores which are mutually displaceable with respect to one another in order to vary the effective diameter of the winding surface, and includes means for fastening said two half slide cores together at a desired relative displacement.

27. Apparatus as defined in claim 3 wherein the number of said slide cores is equal to the number of winding strands of the windings to be produced.

* * * * *